United States Patent
Warner

(10) Patent No.: US 11,332,390 B2
(45) Date of Patent: May 17, 2022

(54) ELECTROMAGNETIC PULSED-WAVE SYSTEM

(71) Applicant: NATURAL SCIENCE, LLC, Big Rock, IL (US)

(72) Inventor: Arden A. Warner, Oswego, IL (US)

(73) Assignee: Natural Science, LLC, Big Rock, IL (US)

(*) Notice: Subject to any disclaimer, the term of this patent is extended or adjusted under 35 U.S.C. 154(b) by 0 days.

(21) Appl. No.: 16/934,734

(22) Filed: Jul. 21, 2020

(65) Prior Publication Data

US 2020/0346949 A1 Nov. 5, 2020

Related U.S. Application Data

(60) Division of application No. 15/700,720, filed on Sep. 11, 2017, now Pat. No. 10,781,114, which is a
(Continued)

(51) Int. Cl.
| | |
|---|---|
| C02F 1/40 | (2006.01) |
| B03C 1/01 | (2006.01) |
| B03C 1/24 | (2006.01) |
| B03C 1/20 | (2006.01) |
| B03C 1/035 | (2006.01) |
| B03C 1/22 | (2006.01) |
| B03C 1/253 | (2006.01) |

(Continued)

(52) U.S. Cl.
CPC .............. *C02F 1/40* (2013.01); *B03C 1/01* (2013.01); *B03C 1/035* (2013.01); *B03C 1/0332* (2013.01); *B03C 1/0335* (2013.01); *B03C 1/18* (2013.01); *B03C 1/20* (2013.01); *B03C 1/22* (2013.01); *B03C 1/24* (2013.01); *B03C 1/253* (2013.01); *B03C 1/286* (2013.01); *B03C 1/30* (2013.01); *C02F 1/488* (2013.01); *C02F 1/681* (2013.01); *E02B 15/041* (2013.01); *B03C 2201/18* (2013.01); *C02F 1/487* (2013.01); *C02F 2101/325* (2013.01); *C02F 2103/007* (2013.01); *C02F 2201/483* (2013.01)

(58) Field of Classification Search
None
See application file for complete search history.

(56) References Cited

U.S. PATENT DOCUMENTS

| | | | |
|---|---|---|---|
| 2,604,207 A * | 7/1952 | Scott | B03C 1/18 209/218 |
| 3,635,819 A | 1/1972 | Kaiser | |

(Continued)

FOREIGN PATENT DOCUMENTS

WO 2016079779 A1 5/2016

*Primary Examiner* — David C Mellon
(74) *Attorney, Agent, or Firm* — Saul Ewing Arnstein & Lehr LLP

(57) ABSTRACT

An electromagnetic pulsed-wave system having an electromagnetic boom for generating a time-varying pulsed-wave to control a colloidal mixture disposed in water and a depository. The electromagnetic boom comprising a plurality of electrically coupled solenoids disposed at the water for providing electromagnetic pulses to generate the time-varying pulsed-wave to transport the colloidal mixture. The depository having an electromagnetic ramp magnetically coupled with the electromagnetic boom and a separation receptacle for separating magnetized particles from the colloidal mixture.

11 Claims, 13 Drawing Sheets

Related U.S. Application Data continuation of application No. 15/662,451, filed on Jul. 28, 2017, now abandoned.

(51) Int. Cl.
    *B03C 1/033*     (2006.01)
    *E02B 15/04*     (2006.01)
    *B03C 1/18*     (2006.01)
    *B03C 1/30*     (2006.01)
    *C02F 1/68*     (2006.01)
    *B03C 1/28*     (2006.01)
    *C02F 1/48*     (2006.01)
    C02F 101/32     (2006.01)
    C02F 103/00     (2006.01)

(56) References Cited

U.S. PATENT DOCUMENTS

| | | |
|---|---|---|
| 3,679,058 A | 7/1972 | Smith |
| 4,497,708 A | 2/1985 | Young |
| 4,978,448 A | 12/1990 | Terokomos |
| 5,772,877 A | 6/1998 | Dvorchik et al. |
| 6,277,276 B1 | 8/2001 | Bratten |
| 7,303,679 B2 | 12/2007 | Ulicny et al. |
| 8,795,519 B2 | 8/2014 | Warner |
| 8,945,393 B2 | 2/2015 | Zahn et al. |
| 9,249,549 B2 | 2/2016 | Warner |
| 9,797,538 B2 | 10/2017 | Warner |
| 2004/0108276 A1* | 6/2004 | Christodoulou ......... B01J 20/10 |
| | | 210/691 |
| 2011/0309026 A1* | 12/2011 | Warner ................... C02F 1/488 |
| | | 210/695 |
| 2015/0008188 A1 | 1/2015 | Warner |
| 2016/0146395 A1 | 5/2016 | Warner |

* cited by examiner

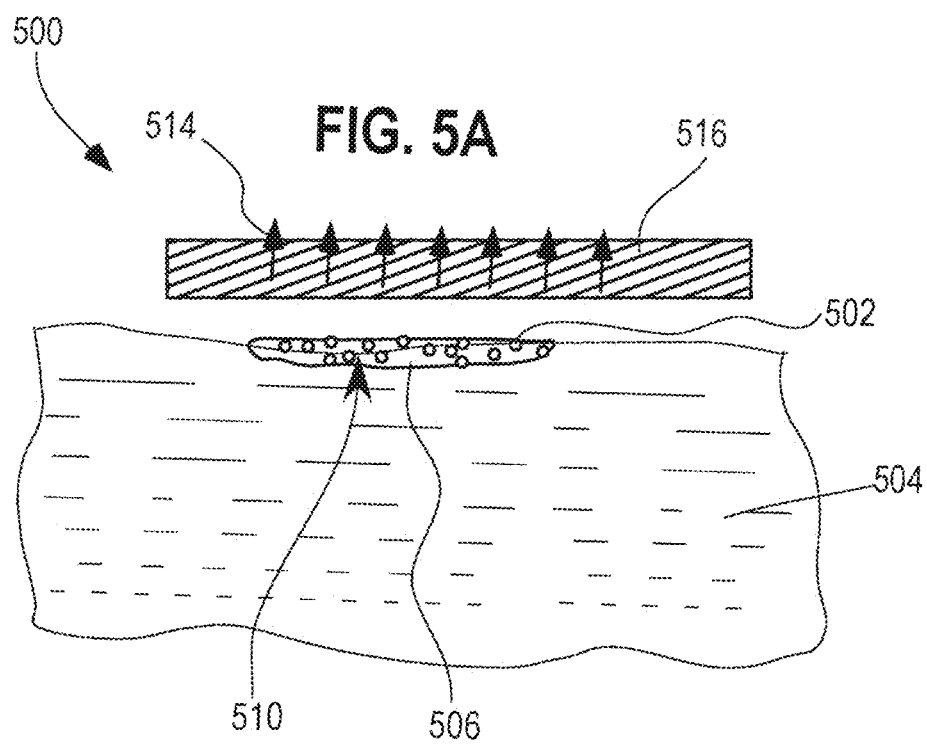
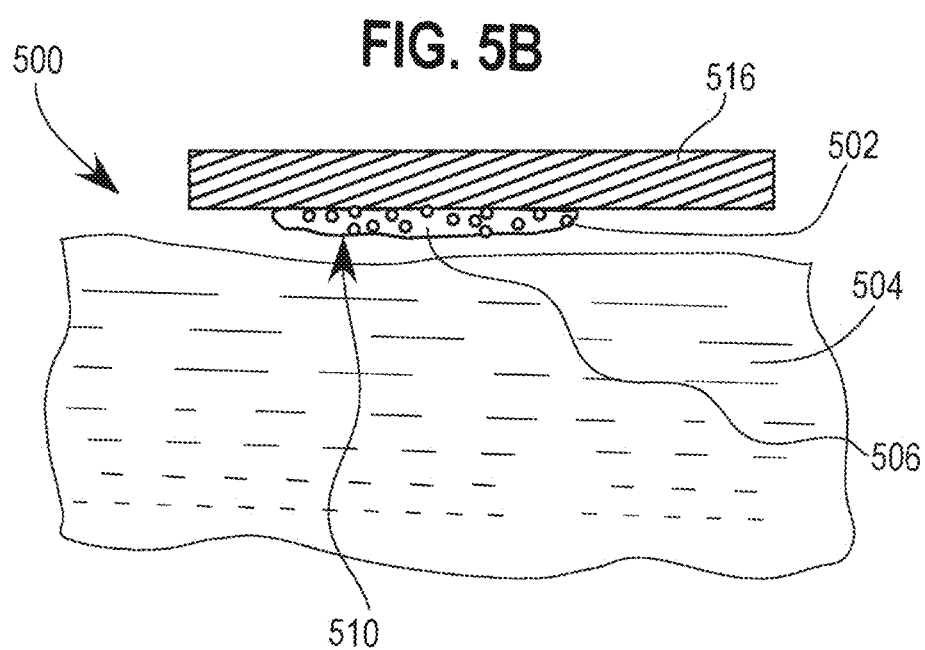

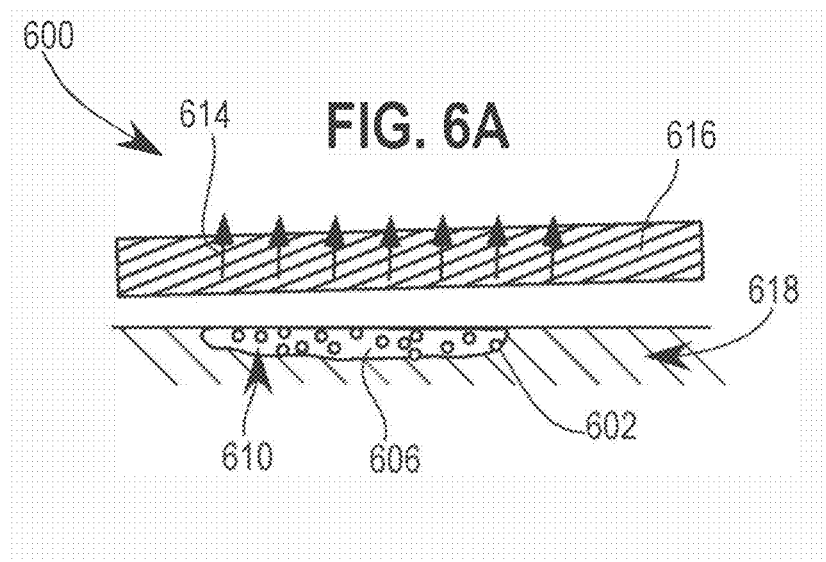
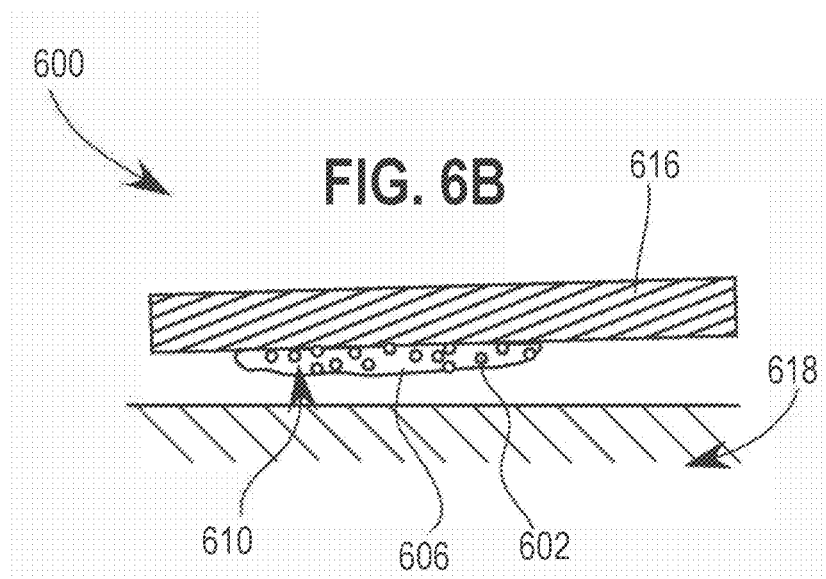

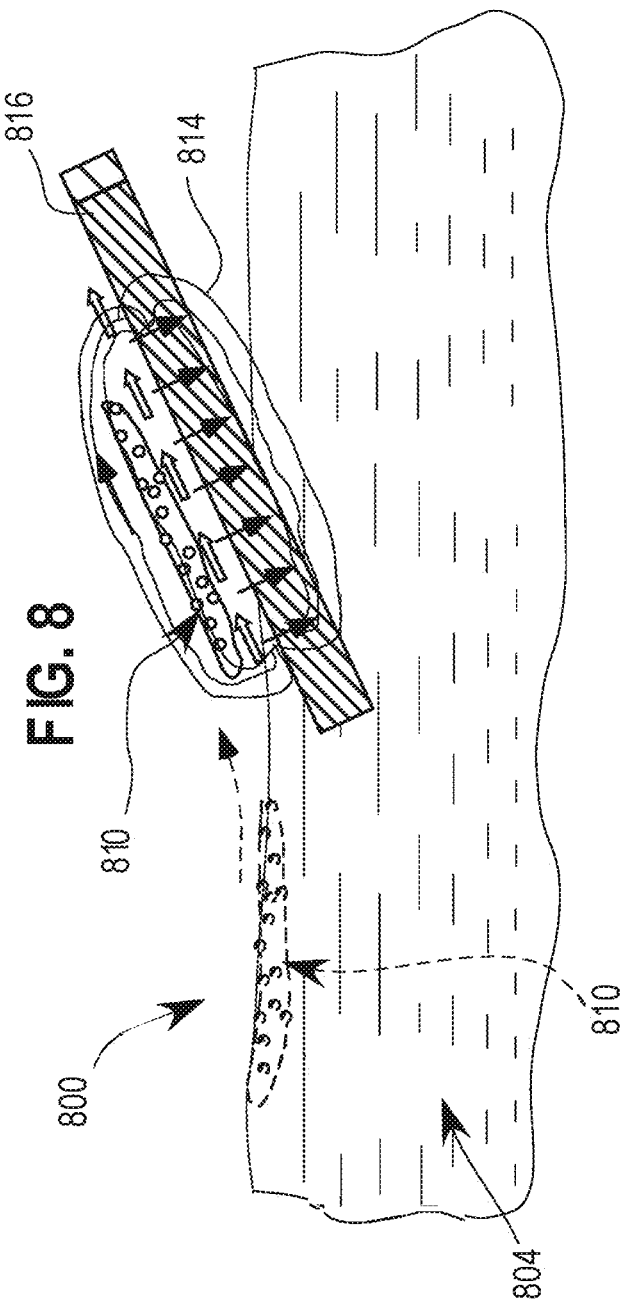

ELECTROMAGNETIC PULSED-WAVE SYSTEM

CROSS-REFERENCE TO RELATED APPLICATIONS

This patent application is a divisional of U.S. patent application Ser. No. 15/700,720, entitled "Electromagnetic Pulsed-Wave System for Oil Manipulation" which was filed on Sep. 11, 2017; which was a continuation of U.S. patent application Ser. No. 15/662,451, entitled "Magnetization Control and Transportation of Oil" which was filed on Jul. 28, 2017; and are herein incorporated by reference in their entirety. This patent application therefore claims the benefit of the above referenced patent applications.

FIELD OF THE INVENTION

This invention relates to the use of magnetic fields for the manipulation of oil. In particular, it relates to the seeding of oil with magnetizable particles, magnetically removing oil from water, reducing the diffusion rate of oil on water, magnetically lifting oil from water and nonporous surfaces, as well as separating the magnetic material from the oil.

BACKGROUND OF THE INVENTION

Fuels such as oil, petroleum, petrol, gasoline, crude oil, motor oil and other hydrogen and carbon based fuels are used extensively. These global uses include powering factories, homes, automobiles, other vehicles, and equipment or machinery.

Given this ubiquity, there is a risk that oil may be spilled, mishandled, or otherwise inadvertently released into the environment so as to pollute or create a contamination hazard. Oftentimes, these releases result in the unwanted disposal of oil within an aqueous environment such as water, groundwater, rivers, lakes, oceans, or the like.

Some known cleaning and removal approaches include chemically using microorganisms or biological agents to breakdown or remove oil, controlled burning, the use of dispersants and dredging, skimming, and vacuum and centrifuge techniques. These known methods, however, are difficult, expensive, and inefficient. This is particularly the case because oil can spread outwardly upon contacting water making it difficult to control and transport.

With respect to chemical dispersants, chemicals are mixed into the environment to attempt to facilitate clean up. Introducing chemicals, however, has shown to have significant negative impacts on marine life and aqueous environment.

In a traditional boom and skimmer system the contaminated area can be isolated by the boom and a mechanical skimmer used to only remove oil located at the surface of the water. This process is time consuming and inefficient. In addition, skimming is susceptible to waves, currents, debris, seaweed, kelp, and other water elements which can reduce skimmer efficiency.

Another known approach is the use of an electromagnetic boom and a magnetic field to collect spilled oil as disclosed in U.S. Pat. Nos. 8,795,519 and 9,249,549 and in U.S. application Ser. No. 14/947,201 which are hereby incorporated by reference. These disclosures, however, fail to describe a magnetization method for controlling and moving oil at a micron level through seeding the oil with magnetizable particles or a pulsed-wave electromagnetic system.

Still another approach requires the use of particles sized on the nanometer scale (particles sized on the scale of $1\times10^{-9}$ meters) for interacting with oil. Nano-particles, however, bond with the oil through atomic forces (e.g. ferrofluids), which makes the separation of the nano-particles from the oil difficult due to the nature of the bond and because the electrochemistry is different from particles sized on the micron scale (particles sized on the scale of $1\times10^{-6}$ meters). Because nano-particles are primarily held in an oil distribution matrix by atomic forces, the separation of the nano-particles from the oil requires more drag force which increases the difficulty of separating, transporting, or otherwise controlling the oil using magnetic field.

Accordingly, a system and method is needed for using magnetization for controlling and transporting oil.

BRIEF SUMMARY OF THE INVENTION

The present invention relates to the use of magnetizable particles for controlling and moving oil in response to a magnetic field. In particular, the invention includes introducing magnetizable particles for seeding the oil. This can reduce the rate of oil diffusion that occurs in water and allows the oil to be magnetically manipulated, removing oil from water, lifting oil from water and nonporous surfaces, as well as separating the magnetizable particles from the oil.

Magnetizable particles such as magnetite, iron oxides, iron filings, ferrite dust filings, or any other similar type of particle can be introduced into a system to help oil spill removal, collection, or cleanup efforts. This invention includes a seeding process that preferentially targets oil by seeding micron-sized magnetizable particles in oil. When seeded in oil, the particles can form a unique and preferential bond with the oil resulting in creation of a colloidal mixture. This bond is a result of a combination of forces including Van der Waal forces. The Van der Waals force is a term used to define the attraction of intermolecular forces between molecules, in particular those molecules sized on the micron scale. The particles preferentially bond with the oil while bypassing any water that is not exposed to oil. Once the bond is formed, the oil is rendered magnetic and can be controlled and moved in response to a magnetic field.

This seeding process also provides a method of probing for oil in water even in situations where the oil is not visible to the naked eye. In one embodiment, the particles can be introduced into a system containing water that may also contain oil. If the particles contact oil, a bond will form between the particles and the oil resulting in creation of the colloidal mixture comprised of both the particles and the oil. This creation of the colloidal mixture can be used to identify the presence and location of the oil.

Oil on water will typically diffuse outward under its own viscous forces until it reaches an equilibrium. This diffusion rate can be reduced, however, through the seeding process since each magnetic particle is essentially a small magnetic dipole which interacts with the internal molecular network of forces and with each other, thus balancing or reducing diffusion forces. Once seeded, in the absence of external forces, the parcel of oil is confined and can be controlled by magnetic forces. By seeding the oil with the magnetic particles, the diffusion rate of the oil can be reduced or inhibited depending on the amount of particles dispersed.

The present invention also relates to the use of a magnetic field to control and move the oil. Once the particles have bonded with the oil to form the colloidal mixture, magnetic fields can be used to control the oil in different ways. When the particles are dispersed in oil on water or on any nonporous surface they are for the most part randomly distributed. In the presence of an applied magnetic field, the particles will generally align themselves with the direction of the magnetic field since each particle is a small dipole magnet in the presence of an external magnetic field. In addition to aligning with the external field, the particles also attract one another. This directional alignment adds rigidity to the colloidal mixture which enhances its viscosity effects orthogonal to the direction of the induced field. This induced viscosity effectively produces a rigidity (i.e. an increase viscosity orthogonal to the magnetics field direction) that allows greater control over the colloidal mixture, e.g. allowing the colloidal mixture to be lifted from the water surface or from other surfaces.

Due to the nature of the size of the particles and the nature of the bond with the oil, magnetic forces also work at moving the colloidal mixture on water. The force on the colloidal mixture of oil and particles is proportional to the gradient of the magnetic field. Due to the low coefficient of friction on the water, the colloidal mixture moves smoothly towards the magnet in the absence of any other external forces, and the water becomes the medium for transporting the oil.

A magnetic field can also be used to separate the bonded particles from the oil. At the interface of the water with another surface, such as some type of barrier, the friction and surface tension forces differ enough so that the particles can be magnetically extracted as they pile up at the boundary interface. A magnet can be used to lift the particles from the water against this interface. The magnetic particles are strongly attracted to the magnet and separate as the magnetic force moves them vertically upward against the barrier.

Consistent with the teachings of the present invention, a pulsed-wave electromagnetic system may be used in conjunction with the methods described herein. In this embodiment, a pulsed-wave can be used to create a magnetic gradient for controlling and transporting an oil spill in a desired location and for extraction and removal from the system. In the presence of external forces such as those due to wave motion, the system can be aligned in the wave direction. This increases the efficiency by contributing constructively in the direction of the magnet forces.

Figure 2A:
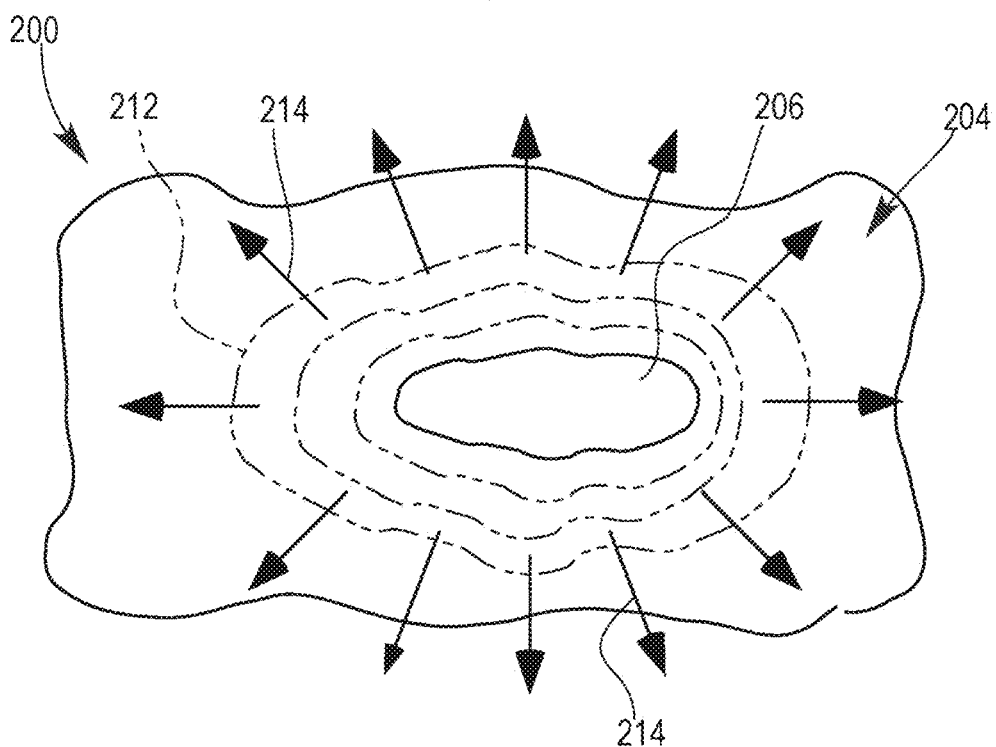
Figure 2B:
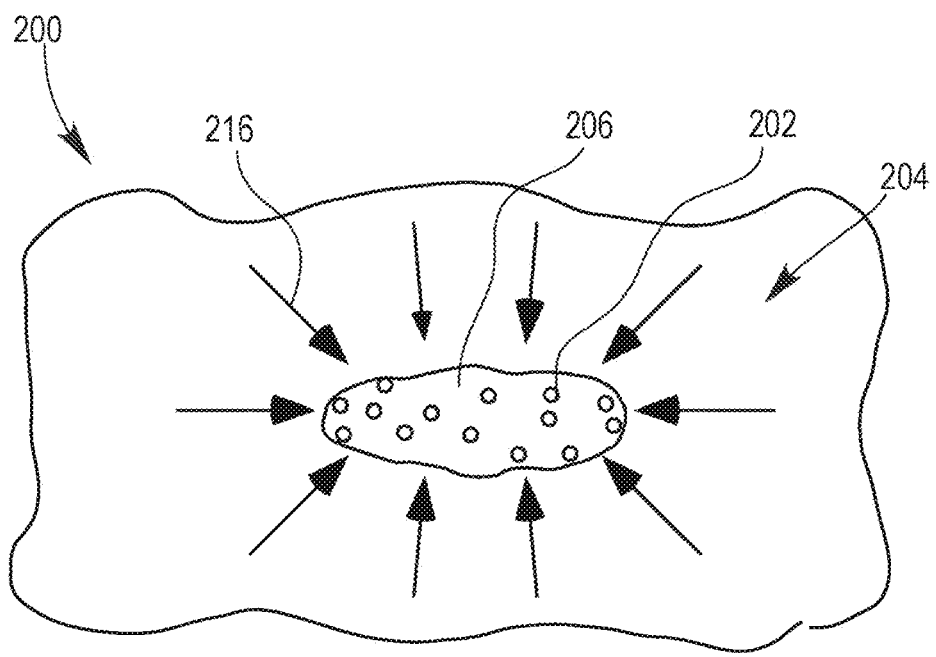
Figure 3A:
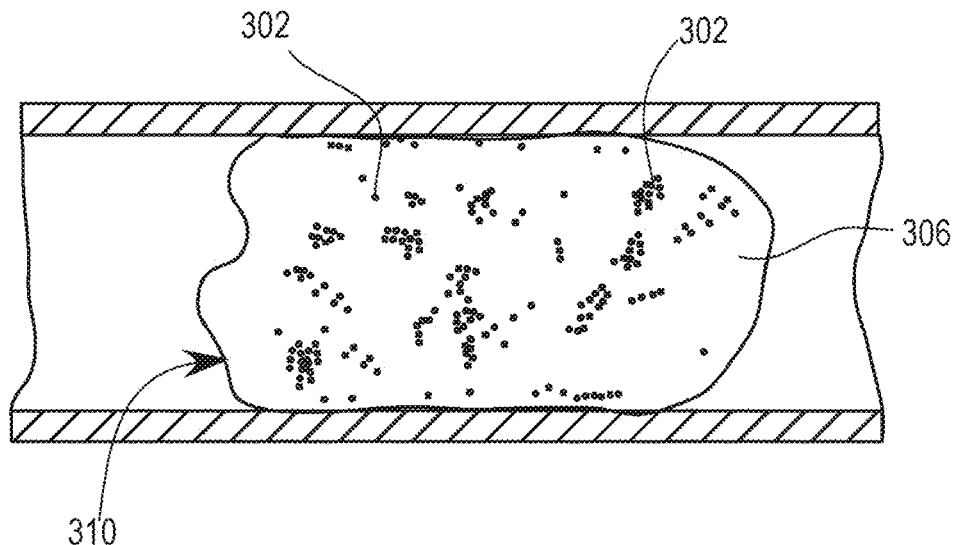
Figure 3B:
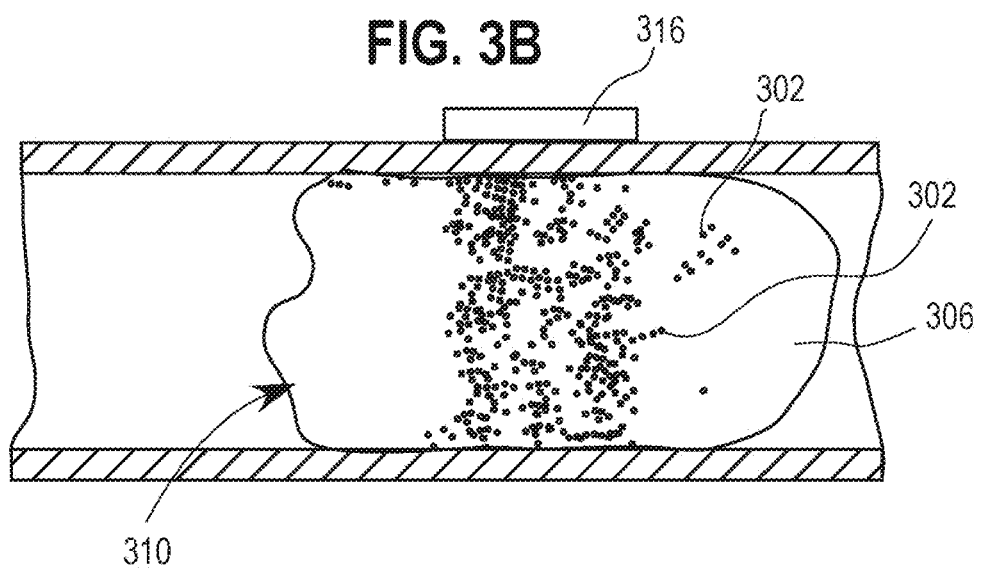
Figure 4B:
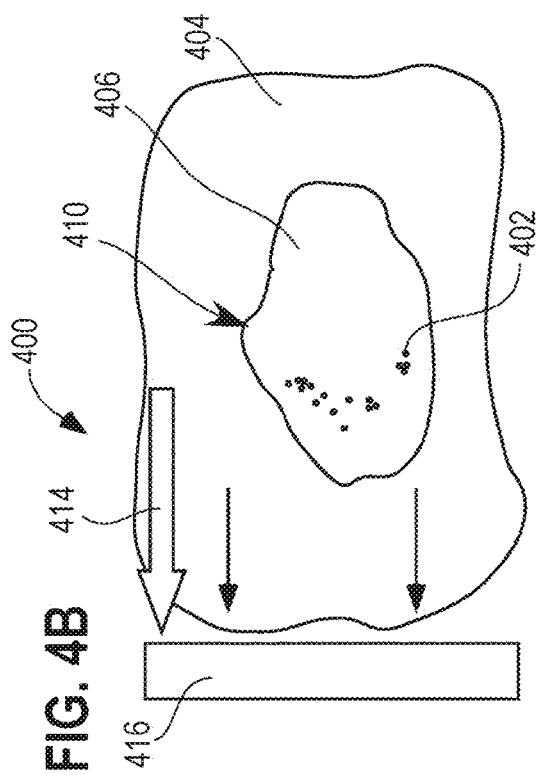
Figure 4D:
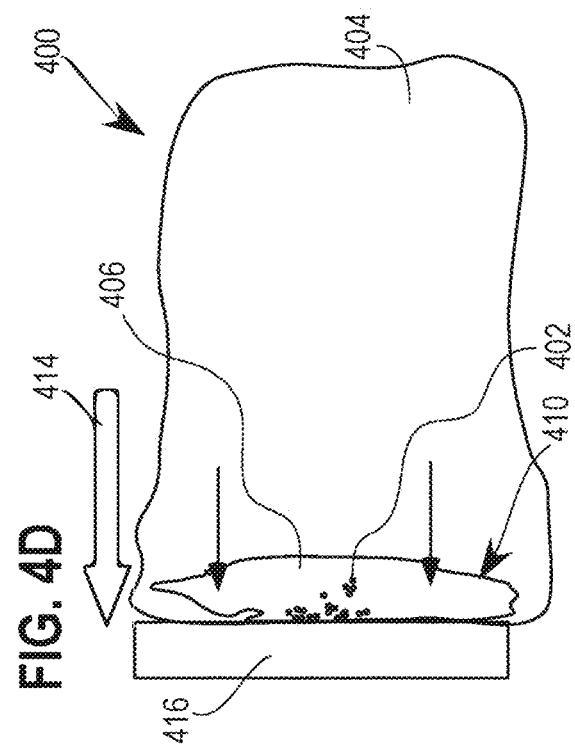
Figure 4A:
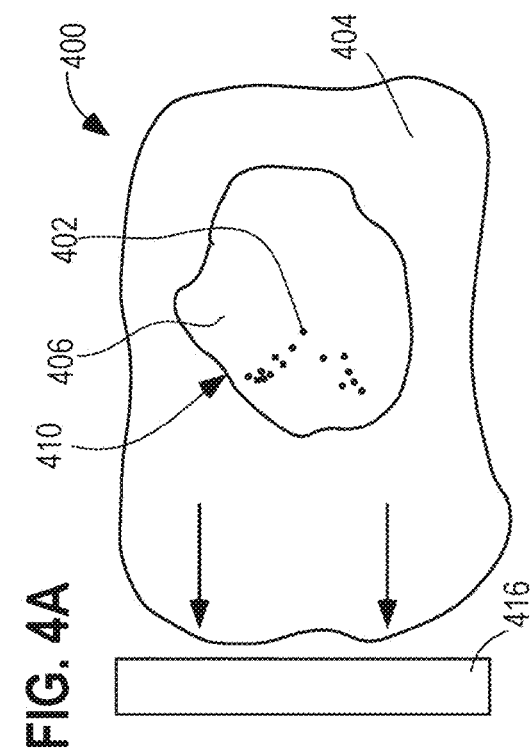
Figure 4C:
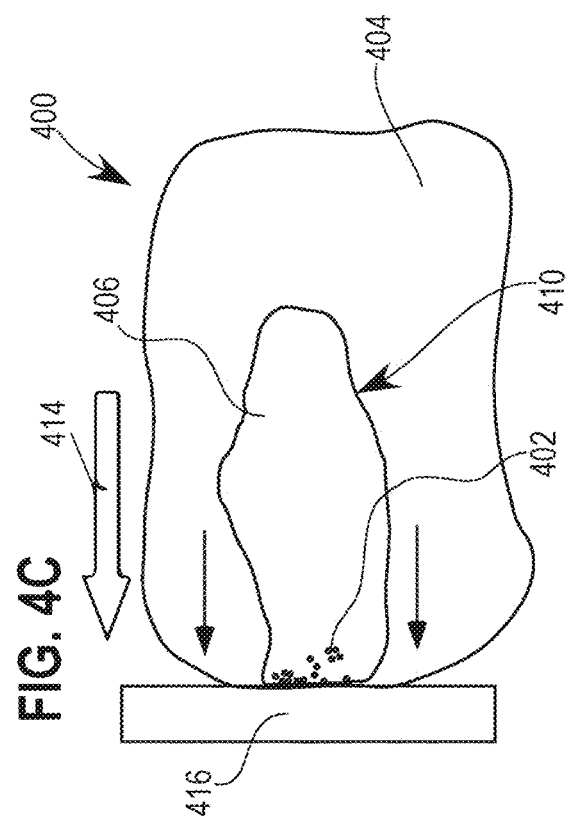
Figure 7A:
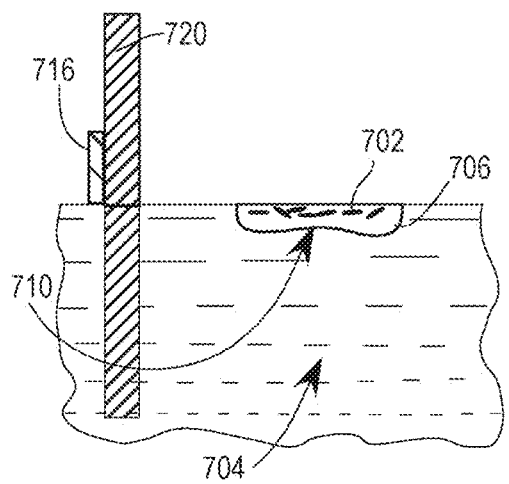
Figure 7B:
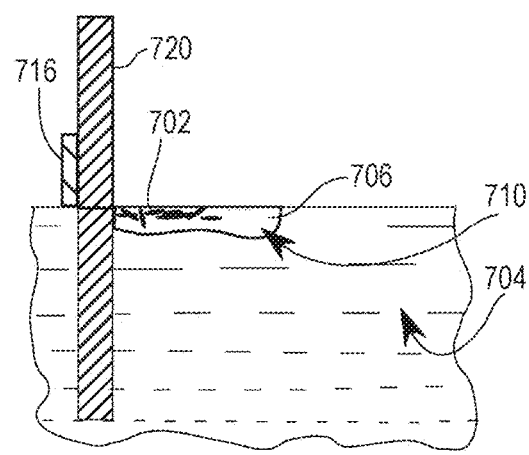
Figure 7C:
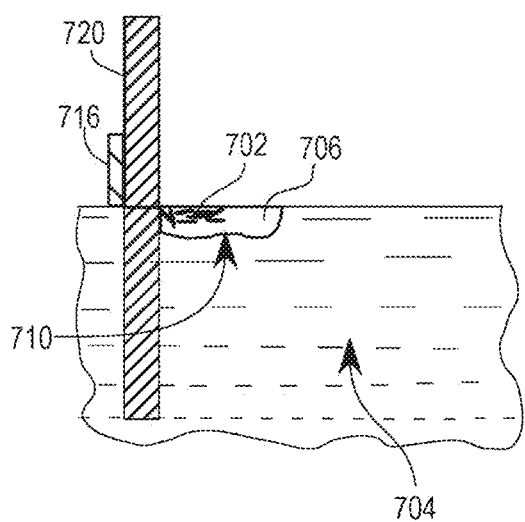
Figure 7D:
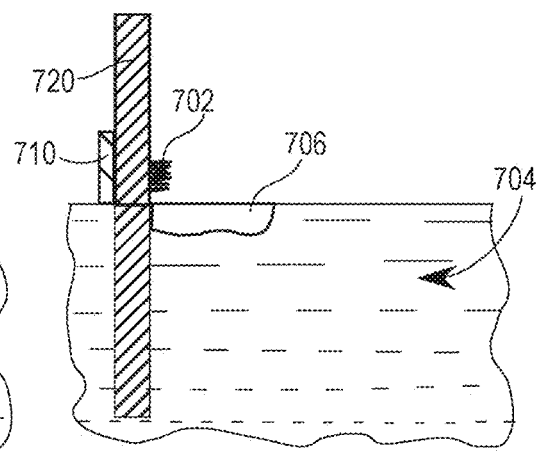
Figure 9:
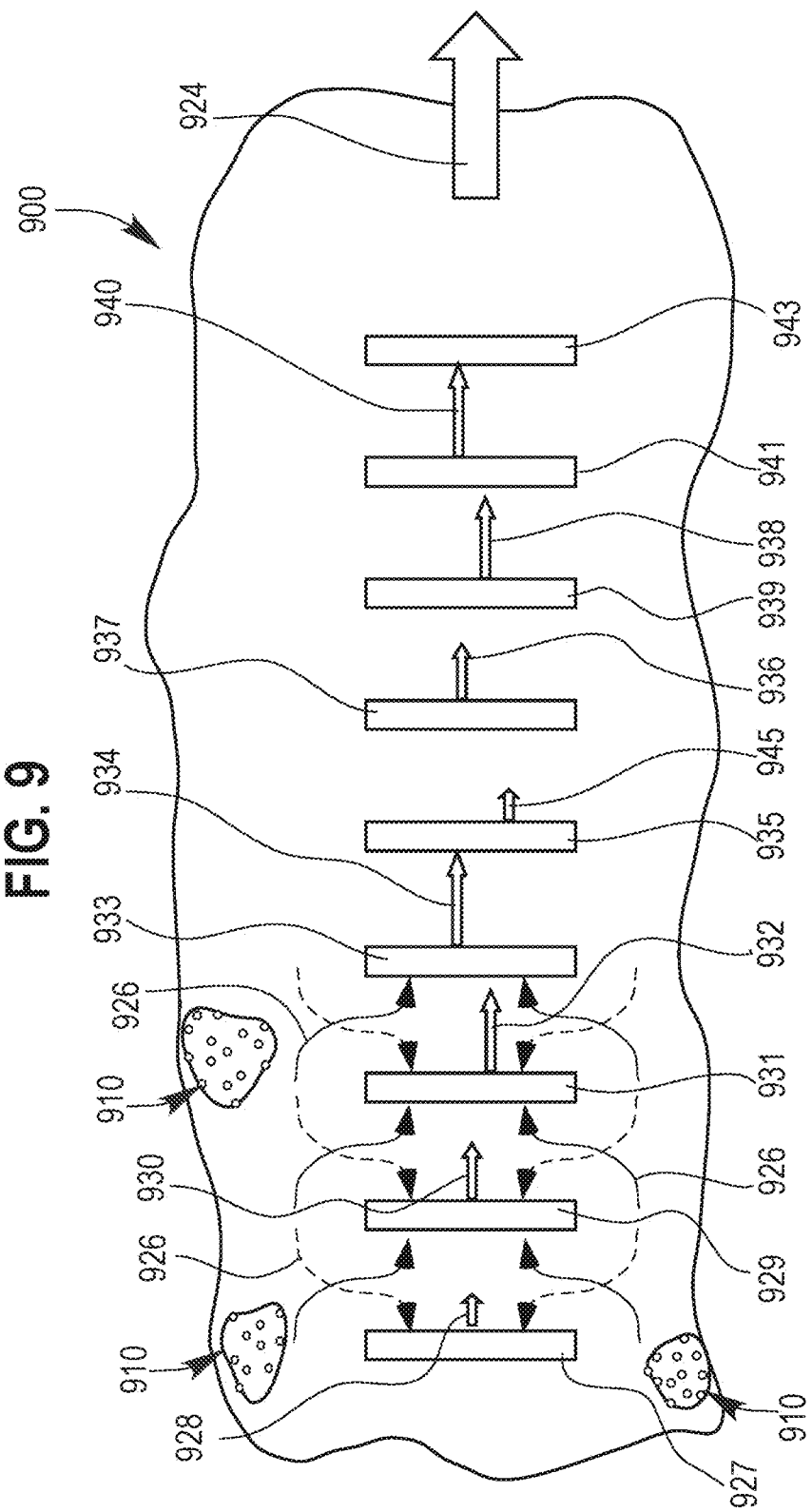
Figure 10:
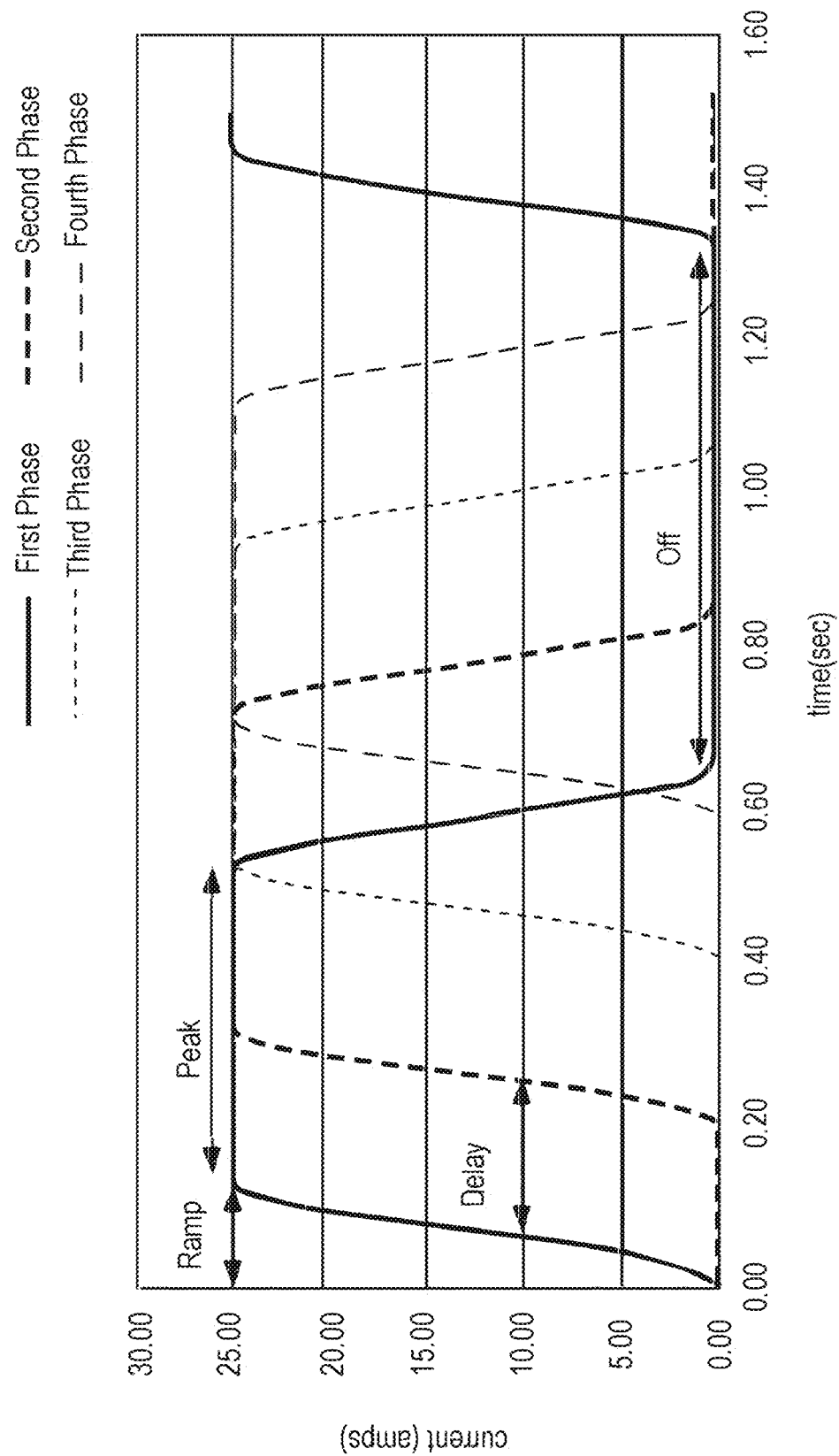
Figure 11:
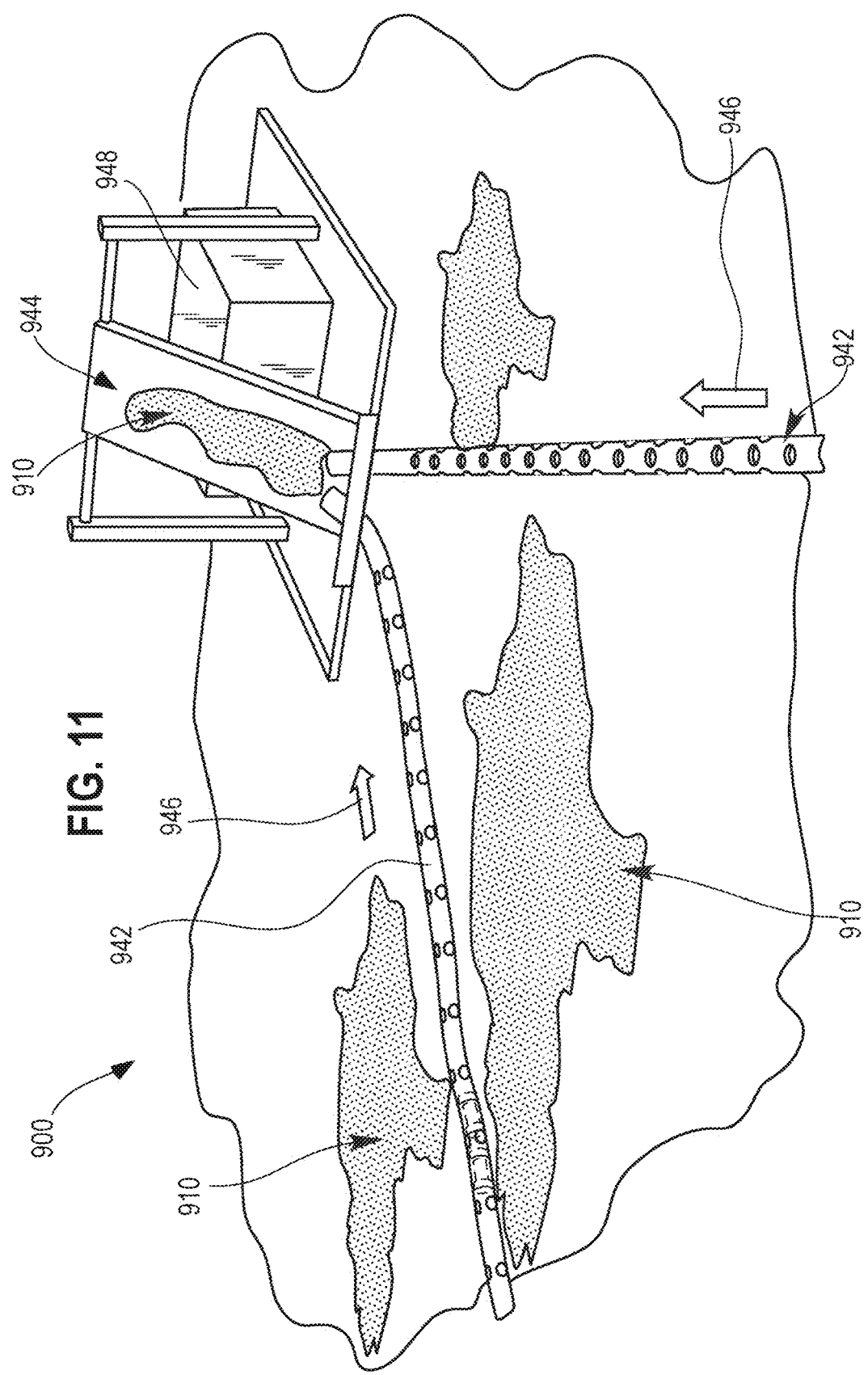
Figure 12:
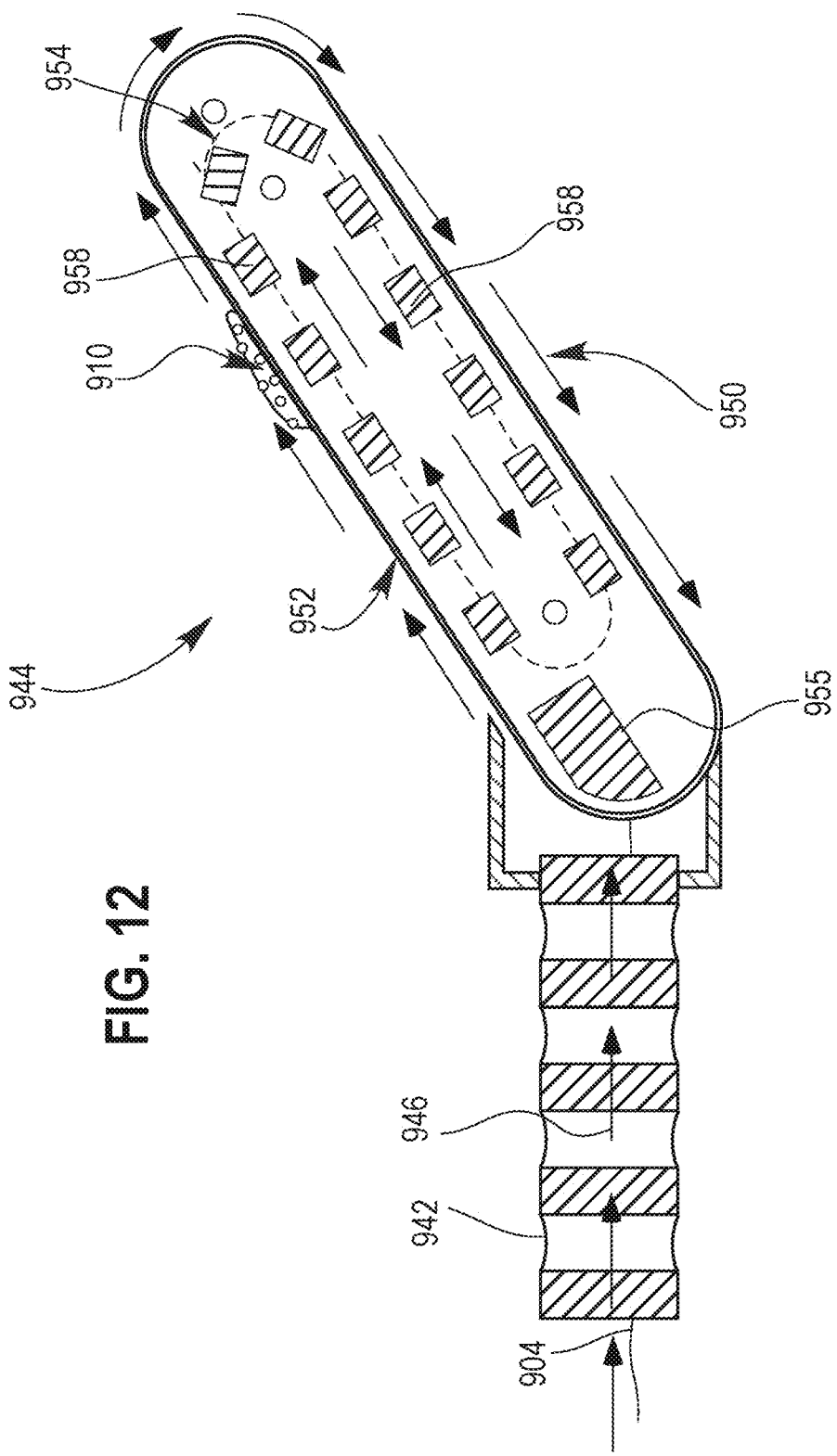
Figure 13:
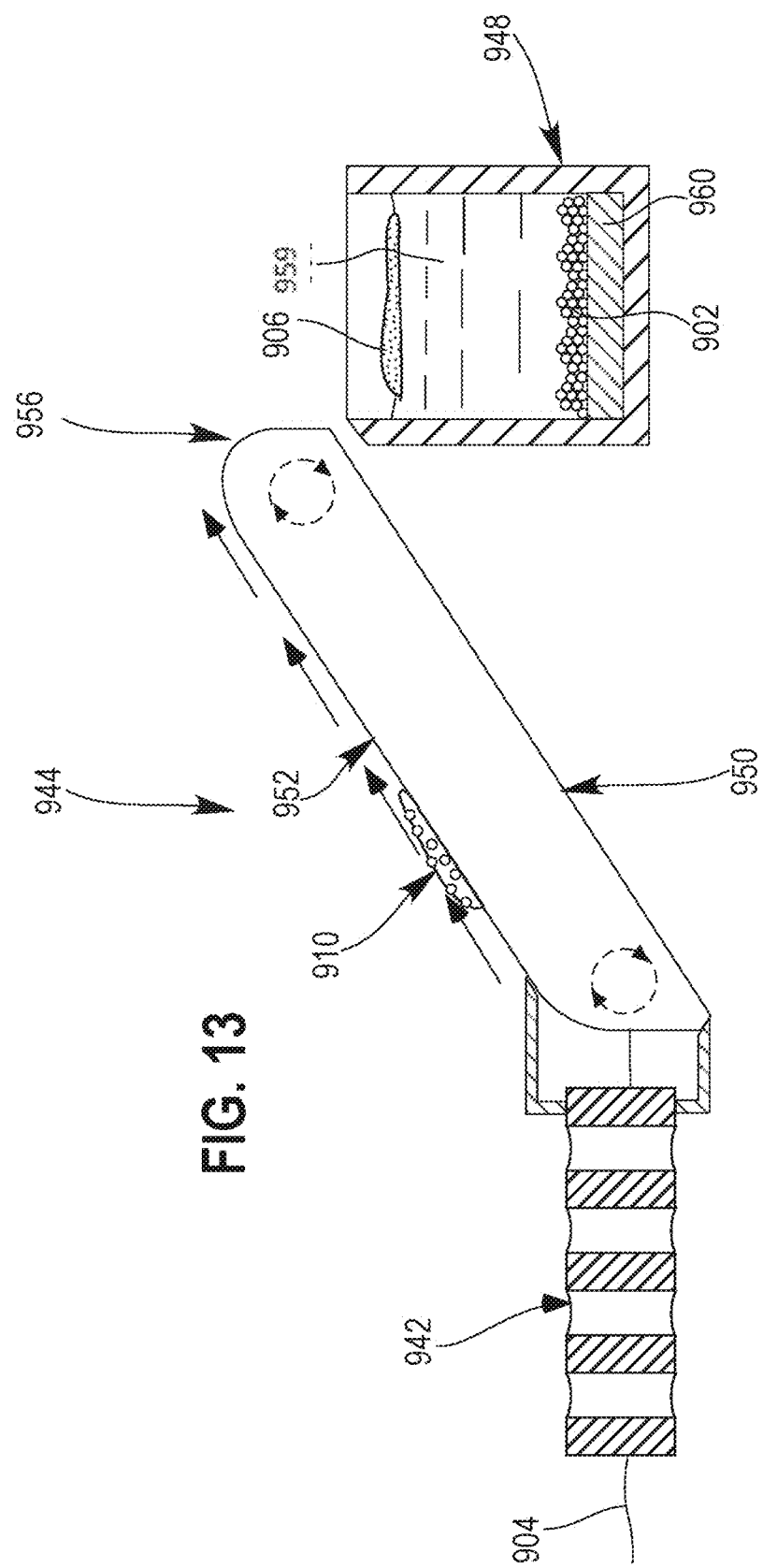

FIG. IB is side view of magnetizable particles introduced into an oil spill in water according to one embodiment of the present invention;

FIG. 2A is a top view of oil diffusion in water according to one embodiment of the present invention;

FIG. 2B is a top view of the magnetizable particles interacting with oil according to one embodiment of the present invention;

FIG. 3 A illustrates magnetizable particles randomly disposed at an oil spill according to one embodiment of the present invention;

FIG. 3B illustrates magnetizable particles that are disposed in general alignment with a magnetic force at an oil spill according to one embodiment of the present invention;

FIG. 4A illustrates a magnetic field being applied to magnetizable particles disposed at oil according to one embodiment of the present invention;

FIG. 4B illustrates a magnetic field being applied to magnetizable particles disposed at oil according to one embodiment of the present invention;

FIG. 4C illustrates a magnetic field being applied to magnetizable particles disposed at oil according to one embodiment of the present invention;

FIG. 4D illustrates a magnetic field being applied to magnetizable particles disposed at oil according to one embodiment of the present invention;

FIG. 5A is a side view of a system having magnetizable particles disposed at oil according to one embodiment of the present invention;

FIG. 5B is a side view of a magnetic field being applied to magnetizable particles disposed at oil according to one embodiment of the present invention;

FIG. 6A is a side view of a system having magnetizable particles disposed at oil according to one embodiment of the present invention;

FIG. 6B is a side view of a magnetic field being applied to magnetizable particles disposed at oil according to one embodiment of the present invention;

FIG. 7A illustrates a magnetic field being applied to magnetizable particles disposed at oil according to one embodiment of the present invention;

FIG. 7B illustrates a magnetic field being applied to magnetizable particles disposed at oil according to one embodiment of the present invention;

FIG. 7C illustrates a magnetic field being applied to magnetizable particles disposed at oil according to one embodiment of the present invention;

FIG. 7D illustrates a magnetic field being applied to magnetizable particles disposed at oil according to one embodiment of the present invention;

FIG. 8 is a side view of a system having magnetizable particles disposed at oil and an interaction with a magnetic field according to one embodiment of the present invention;

FIG. 9 illustrates an electromagnetic pulsed-wave system having a plurality of magnetic solenoids according to one embodiment of the present invention;

FIG. 10 is a graphical view of a waveform sequence associated with one embodiment of the present invention;

FIG. 11 is a perspective view of a system for using an electromagnetic pulsed-wave system for transportation of oil according to one embodiment of the present invention;

FIG. 12 illustrates a system for magnetically removing oil according to one embodiment of the present invention; and FIG. 13 illustrates a system for magnetically removing oil according to one embodiment of the present invention.

DETAILED DESCRIPTION OF THE DRAWINGS

The detailed description set forth below in connection with the appended drawings is intended as a description of the presently preferred embodiments of the invention and is not intended to represent the only forms in which the present invention may be constructed or utilized. The description sets forth the system, methods, and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

This detailed description relates to an invention for seeding magnetizable particles with oil. Once seeded, the oil becomes susceptible to a magnetic field that can be used for controlling or moving oil. Various applications can include the identifying, separating, lifting, raising, or otherwise transporting of the oil.

The invention and processes described herein are generally controlled by the Van der Waals force in the aqueous phase. As known in the art, the Van der Waals force is a term used to define the attraction of intermolecular forces between molecules, and it is particularly relevant in molecules sized on the micro-scale ($1 \times 10^6$ meters). The Van der Waals force can provide short-range, electrostatic attractive forces between molecules that arise from the interaction of permanent or transient electric dipole moments.

When dispersed in oil, magnetizable particles can form a unique and preferential bond with the oil. This bond is formed as result of a combination of forces including the intermolecular Van der Waal forces associated with the magnetizable particles and oil. If the oil is dispersed in water, the surface tension of the water may also assist in forming the bond. As a result of this bond, a colloidal mixture is created that includes the particles and oil. Once the bond is formed, oil can be controlled and moved in response to a magnetic field. As used herein, a colloidal mixture may be any type of mixture or combination formed as a result of the interaction of the Van der Waals forces between the magnetizable particles and oil.

Oil can be seeded with magnetizable particles in many different environments. For example, the bonding may occur when oil is spilled or discovered in many different types of aqueous solutions associated groundwater, rivers, lakes, oceans, marshes, swamps. This can be salt water, or fresh water environments. The seeding process can also be implemented on oil trapped below the surface of the water and on non-porous surfaces.

The magnetizable particles include iron oxides such as Fe2O4, Fe2O3, FeO as well as iron filings. However, magnetite ($Fe_3O_4$) is preferred because it is stable, does not oxidize (rust) and is natural to the environment. These magnetizable particles may also generally be sized on the micron scale ($1 \times 10^6$ meters) and preferably in the range of 2 pm-10 pm. In some applications, the amount of magnetizable particles that are required can vary based on a number of factors including the amount of oil that is present, the environment, the applied magnetic field, or the type of control or movement of the oil that is desired.

Consistent with the teachings of this invention, as used herein, oil may be many different types of hydrocarbons including petroleum, petrol, gasoline, crude oil, motor oil and any oil spill, other similar compounds that are capable of bonding with the magnetizable particles.

Figure 1A:
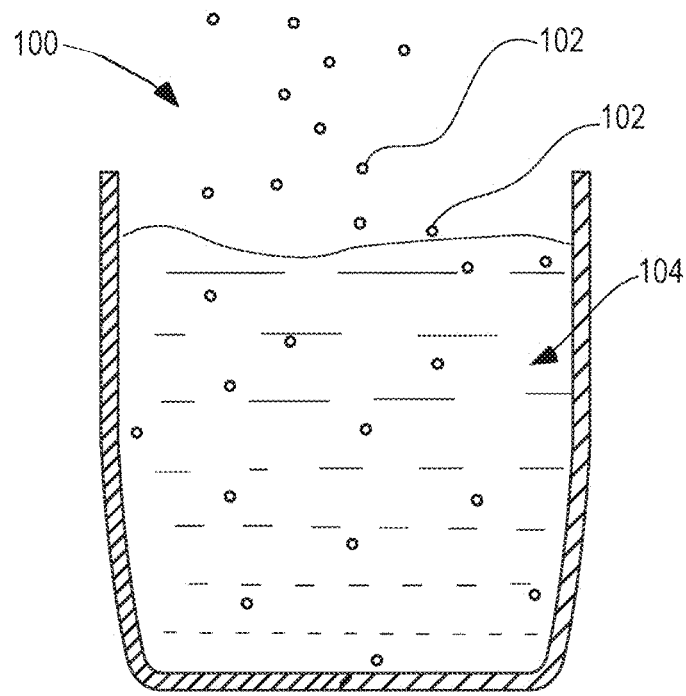
FIG. 1A a side view of magnetizable particles introduced into water according to one embodiment of the present invention.
Figure 1B:
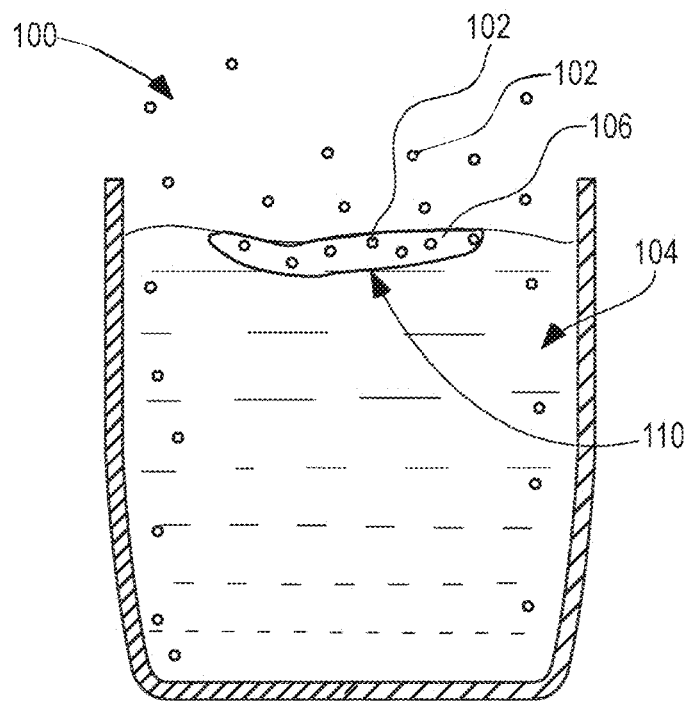

A system 100 is illustrated in FIGS. 1A-1B that includes magnetized particles 102 and oil 106 dispersed in water 104. In this example, the seeding process can help probe for the existence of oil even if it cannot be seen by the naked eye. As shown in FIG. 1B, the magnetizable particles 102 are introduced to system 100. Once introduced, the magnetizable particles 102 will seed with the oil 106 they contact while passing through any water 104 that is not exposed to the oil 106. As a result, a colloidal mixture 110 is formed and can be visually detected.

In contrast, the system 100 in FIG. 1A includes water 104 but no oil. When the magnetizable particles 102 are introduced, they will flow through the water 104 without any seeding and thereby indicate that no oil is present.

As shown in FIGS. 2A-2B, when oil 206 is disposed in water 204, it will typically diffuse outward under its own viscous forces until it reaches an equilibrium. As shown in FIG. 2A, an initial plume of oil 206 is disposed in the water 204. Over time, the oil will spread outwardly 212 as a result of diffusion and viscous forces 214. In cases such as an oil spill, this outward spread—if left uncontained—can cause significant pollution and contamination.

By seeding magnetizable particles 202 with the oil 206, however, the diffusion rate of the oil can be reduced. Referring to FIG. 2B, magnetizable particles 202 are introduced into the system 200 to contain the spread of the oil 206. The magnetizable particles 202 bond with the oil 206 and introduce new forces 216 into the system 200. These new forces 216 include the Van der Waals forces associated with the bond between the magnetizable particles 202 and the oil 206 as well as the individual internal forces associated with each of the magnetizable particles 202. The distribution of these forces 216 can oppose the diffusion and viscous forces 214 resulting in a reduction of the rate of oil spread. Eventually, the oil spread will stop once the system forces reach equilibrium.

An additional amount of magnetizable particles 202 may be introduced to the system 200 to add additional force. In one example, the ratio between the amount of magnetizable particles 202 that are introduced into the system 200 relative to the amount of oil 206, could be such that the amount of the oil 206 does not introduce more diffusion and viscous drive force than the forces exerted as a result of the introduction of the magnetizable particles 202.

Once seeded, the particles may be generally dispersed on the oil in a random distribution. A magnetic field can be used to align the magnetizable particles in a rigid configuration as shown in FIGS. 3A and 3B. Referring to FIG. 3A, the magnetizable particles 302 are randomly seeded throughout the oil 306. Generally, this less structured and randomized configuration is weaker and makes it more difficult to control or move the oil 306. As shown in FIG. 3B, however, a magnet 316 applies a magnetic force to the particles 302. Each particle 302 includes an internal dipole magnet. Accordingly, when the magnetic force is applied to the particles 302, they move from the random distribution to an orientation that is generally aligned in the direction of the magnetic field. This results in a stronger configuration that permits increased control over the magnetizable particles 302, oil 306, and the colloidal mixture 310. [0056] A magnetic field can also be used to move the oil in a general direction as illustrated in FIGS. 4A-4D. The system 400 includes magnetizable particles 402 and an oil plume 406 that is dispersed in water 404. A resulting colloidal mixture 410 is formed as a result of the bond formed by the seeding of the magnetizable particles 402 with the oil 406. In this example, a magnet 416 exerts a force creating a magnetic field gradient 414 within the system 400. Accordingly, the strength of the magnetic force as applied to the colloidal mixture 410 changes based on distance from the magnet 416. Generally, the magnetic force applied on the colloidal mixture 410 is proportional to the magnetic field gradient.

In this example, water serves as the medium for transporting the oil. Given the low coefficient of friction on the water, the colloidal mixture 410 can move smoothly towards the magnet 416. Also, due to the nature of the size of the particles 402 and the nature of the bond with the oil 406 formed by the Van der Waals force, magnetic fields generally work well at moving the colloidal mixture 410 on water.

Referring to FIG. 4A, magnetizable particles 402 have bonded with oil 406 to form the colloidal mixture 410 in water 404. In FIG. 4B, a low magnetic force begins to attract the colloidal mixture 410 in the direction of the magnet 416.

As shown in FIG. 4C, the colloidal mixture 410 continues to move toward the magnet 416 as the magnetic force becomes stronger.

Still referring to FIG. 4C, the stronger magnetic force causes the bonded magnetizable particles 402 to move relative and toward the distal end of the oil plume 406. While the magnetizable particles 402 are not uniformly distributed about the oil plume 406, the bond continues to exist between the magnetizable particles 402 and the oil 406. In addition, the internal and strong elemental bonds between the individual oil molecules are not broken. Accordingly, and referring to FIG. 4D, the magnetic particles 402 and the oil plume 406 are transported to the desired location.

A magnetic field can be used to lift oil from a surface as shown in FIGS. 5A-5B, 6A-6B, and 8. Referring to FIGS. 5A-5B, a system 500 includes magnetizable particles 502 that are bonded with oil 506. The resulting colloidal mixture 510 is disposed on water 504. In this example, a magnet 516 exerts a magnetic force 514 that lifts the colloidal mixture 510 away from the water 504 and toward the magnet 516. In water, both the magnetic force 514 and water surface tension force facilitates the lifting of the colloidal mixture 510. The amount of magnetizable particles 502 needed for the lifting application depends on many factors such as the amount of oil, the strength of the magnetic force, and other environmental conditions. In one example, this amount should be enough to provide an attractive force with respect to the magnetic field, and coupled with the water surface tension force, that is greater than the other opposing forces. Application of this embodiment of the invention can occur in many different ways including for the removal of oil from contaminated groundwater, lakes, oceans, rivers and the like. Similarly, this embodiment can also apply to other possibly more dense porous landscapes such as marshes, swamps, and bogs where additional forces may exist.

FIG. 8 illustrates a system 800 for removing a colloidal mixture 810 from water 804. A magnet 816 creates a magnetic field 814 for attracting the colloidal mixture 810. In this example, the magnet 816 is disposed at the water 804 in an inclined configuration. Accordingly, the magnetic field 814 can be applied to move the colloidal mixture 810 up the inclined configuration for removal from the system 800. As a result of the angle of inclination and the non-absorbent nature of the materials used, the system does not collect water and is more efficient at collecting oil than existing methods.

Referring to FIGS. 6A and 6B, a system 600 is shown that includes a nonporous surface 618. System 600 includes a magnet 616 that exerts a magnetic force 614 for raising a colloidal mixture 610 from a nonporous surface 618. A nonporous surface 618 may include any fields, grass, dirt, concrete or other ground surface. With respect to nonporous surfaces, however, additional force may be needed to lift the colloidal mixture 610 as the water surface tension force may not exist. This can be achieved by using a stronger magnetic force or by adding more magnetizable particles 602 to the system 600.

As discussed above, a magnetic field can be used to move magnetic particles from a random distribution to an orientation that is generally aligned in the direction of the magnetic field. This can also facilitate the lifting of the colloidal mixtures 510, 610 that is described in FIGS. 5A-5B and 6A-6B. This directional alignment of the magnetic particles 502, 602 adds rigidity to the colloidal mixture 510, 610 which enhances its viscosity effects orthogonal to the direction of the induced field. This induced viscosity effectively produces the rigidity that helps the colloidal mixture 510, 610 to be lifted from water or from other surfaces.

It may also be useful to separate the particles from the colloidal mixture once the oil has been moved to a safe and desired location. The removed particles can then be recycled and reused. As illustrated in FIGS. 7A-7D, a magnet 716 is used to separate the bonded magnetizable particles 702 from the oil 706. An interface exists between the water and a separation barrier 720. In this instance, the separation barrier 720 is a vertical column disposed between the magnet 716 and the colloidal mixture 710, but it can be any type of object that provides the friction capable of separating the magnetizable particles from oil. At this interface, the friction and surface tension forces differ enough to extract the particles 702 as they pile up at the boundary interface between the magnet 716 and the water 704. The particles 702 are strongly attracted to the magnet 716 and can be separated from the oil 706 as the magnetic field moves them vertically upward against the separation barrier 720. This principle may also be used to separate the particles from oil in the absence of water.

An electromagnetic pulsed-wave system 900 is illustrated in FIGS. 9-11. This system 900 provides a pulsed-wave for moving oil that has been dispersed in water to a desired location. As described above, the magnetizable particles are introduced into the system 900 to bond with oil and form a colloidal mixture 910. The system 900 includes a group of electrically coupled solenoid magnets that are configured to generate a time-varying magnetic gradient pulse that travels axially in the flow direction 924. In this example, solenoid magnets 927, 929, 931, 933, 935, 937, 939, 941, and 943 are described, but any number of solenoid magnetics may be used.

In this example, each of the solenoid magnets are linearly connected and exert a magnetic field that is capable of attracting the colloidal mixture 910 and then moving it along a desired path in the flow direction 924. In particular, the magnetic field produced from each solenoid can attract the colloidal mixture as represented by attraction flow paths 926. Each solenoid is also capable of transporting the colloidal mixture along direction of the magnetic force.

In this example, each solenoid is separated by approximately 0.79 times the radius "R" of the solenoid coils. This spatial configuration provides gradient coupling between the coils because it is less than the known "Helmholtz spacing" for coils. In operation, a magnetic gradient also exists between each of the solenoids as the associated magnetic field varies as it moves further away from the solenoid.

The parameters for the electromagnetic pulsed-wave system 900 are based on a stepped multiphase concept. The number of phases for the system 900 can be based on parameters such as power consumption, flow efficiency, magnetic field strength, timing and the spacing of the associated magnets or solenoids. This can also include the geometric factors associated with the magnets themselves. Ideally, the parameters identified above would be optimized so as to accommodate the magneto-fluid dynamics associate with oil flow on water.

An electromagnetic pulsed-wave can be generated by many different wave sequences. In this example, a 4-phase sequence is used to generate the electromagnetic pulsed-wave and magnetic gradient in the desired flow direction 924. Referring to FIG. 9, first phase solenoids 927 and 935 are paired to generate an electromagnetic pulses 928 and 945 at the same time. Similarly, second phase solenoids 929 and 937 are paired to generate an electromagnetic pulse 930, 936 at a later time offset from that of the first phase solenoids 927, 935. Third phase solenoids 931 and 939 generate an electromagnetic pulse 932, 938 at a time offset from the second phase solenoids 931, 939. And fourth phase solenoids 933 and 941 generate an electromagnetic pulse 934, 940 at a time offset from the third phase solenoids 931, 939. This configuration results in the propagation of an electromagnetic pulsed-wave capable of moving the colloidal mixture in the flow direction 924.

Referring to FIG. 10, an electromagnetic pulsed-wave can be generated by powering the solenoid magnets on and off in cycles so as to produce a chain of magnetic dipole fields that move from one end of a string of solenoid magnets to the other. FIG. 10 illustrates a schematic plot of current versus time for different time intervals for phases associated with the first 927, 935, second 929, 936, third 931, 939, and fourth 933, 939 solenoid magnets as identified in FIG. 9.

These operational states can be governed by the following 4 variables:
1) $T_{ramp}$—the time it takes for magnet to turn on or off
2) $T_{peak}$—the time when the solenoid is at its peak
3) $T_{Off}$—the time between pulses
4) $T_{delay}$—the time between the start of a magnet's power cycle and the start of the next magnet's power cycle Accordingly, $T_{on}$ is determined as $T_{on}=T_{ramp}+T_{peak}+T_{ramp}$.

$T_{period}$ is determined as $T_{period}=T_{on}+T_{Off}$

In order to produce a chain of magnetic dipole fields that move from one end of a string of magnets to the other, $T_{delay}$ should divide evenly into $T_{period}$—The optimum separation between the dipole fields occurs when $T_{on}=T_{off}$.

Referring to FIG. 11, the pulse-wave system 900 includes an electromagnetic boom system 942 and a depository 944. The electromagnetic boom system 942 includes the plurality of solenoid magnets, as described above, that are capable of providing an electromagnetic pulsed-wave. Each of solenoids provides a magnetic force for attracting and transporting the colloidal mixture 910 in a flow direction 946. The rate at which the colloidal mixture 910 moves in the flow direction 946 is proportional to the magnetic field gradient and viscosity of the spilled oil.

The colloidal mixture 910 can move along the electromagnetic boom 942 until it reaches the depository 944. Referring to FIGS. 12-13, a depository 944 includes an electromagnetic skimmer 950 that is used to remove the colloidal mixture 910 from water 904. The electromagnetic skimmer 950 can be generally disposed in an upward and inclined configuration and magnetically coupled to the electromagnetic boom 942 such that the colloidal mixture 910 can be transferred. The skimmer 950 also includes an electric dipole magnet 955 disposed proximate to the interface of the electromagnetic boom 942 and skimmer 950 so as to facilitate transfer of the colloidal mixture 910.

The electromagnetic skimmer 950 also includes a rotating outer belt 952 and a rotating permanent magnet belt 954. Both belts 952 and 954 can rotate continuously about the electromagnetic skimmer 950 and can be configured to move at different relative speeds. The electric dipole magnet 955 assists in magnetically removing the oil 906 from the system 900 to the rotating outer belt 952. In this example, the rotating outer belt 952 is magnetically coupled with the electromagnet boom 942 so as to receive the oil 906 from the water 904. This permits the rotating outer belt 952 to carry the oil upward toward a separator section 956. The rotating permanent magnet belt 954 includes a plurality of magnets 958 that are located interior to the rotating outer belt 952. These magnets 958 can apply a magnetic force to facilitate control and attraction of the oil disposed on the outer rotating belt 952. Since the speed of the rotating permanent magnet belt 954 can be adjusted, the magnetic force created by the magnets 958 can vary in direction and scope.

The electromagnetic skimmer 950 also forms a separator section 956 where the colloidal mixture can exit to the separation container 948. The separator section 956 is positioned within the electromagnetic skimmer 950 so as to be affected by little to generally no magnetic force. When the carried colloidal mixture 910 reaches the separation section 956, it is able to exit to the separation container 948 under the force of gravity. As shown in FIG. 13, the separation container 948 is filled with water 959 and includes a magnet 960 disposed toward its bottom section. Once the colloidal mixture 910 enters the separation container 948, the magnet 960 is configured to provide a strong enough magnetic field to attract the magnetizable particles 902 toward the bottom of the container 948 while the oil 906 remains in the water 959 at a top portion of the container 948. This separation permits the magnetizable particles 902 to be recycled and reused.

It is understood that the exemplary system and method described herein and shown in the drawings represent only presently preferred embodiments of the invention. Various modifications and additions may be made to such embodiments without departing from the spirit and scope of the invention.

What is claimed is:

1. An electromagnetic pulsed-wave system for controlling a colloidal mixture dispersed in water, comprising:
    an electromagnetic boom having a plurality of electrically coupled solenoids disposed at the water for providing an electromagnetic pulsed-wave to transport the colloidal mixture; and
    a depository for receiving the colloidal mixture having an electromagnetic ramp magnetically coupled to the electromagnetic boom via a first solenoid of the electromagnetic boom disposed approximate to an electric dipole magnet disposed within a central body of the electromagnetic ramp such that a position of the electromagnetic boom is retained relative to the electromagnetic ramp, wherein the central body has a proximal end portion generally disposed at the water and extending at an upwardly inclined angle away from the water to a distal end portion.

2. The electromagnetic pulsed-wave system of claim 1 wherein each of the plurality of electrically coupled solenoids are linearly connected.

3. The electromagnetic pulsed-wave system of claim 1 wherein the electromagnetic ramp includes a dual rotating belt system.

4. The electromagnetic pulsed-wave system of claim 1 wherein the depository further comprises a separation receptacle adjacent to the distal end portion and having a magnet disposed toward a bottom portion of the depository.

5. The electromagnetic pulsed-waved system of claim 4 wherein the separation receptacle is adapted to separate oil from the colloidal mixture.

6. The electromagnetic pulsed-wave system of claim 4 wherein magnetized particles are separated from the colloidal mixture in the separation receptacle.

7. An electromagnetic pulsed-wave system for generating a time-varying pulsed-wave to control a colloidal mixture dispersed in water, comprising:
    an electromagnetic boom having a plurality of electrically coupled solenoids disposed at the water for providing an electromagnetic pulsed-wave to transport the colloidal mixture; and a depository for receiving the colloidal mixture having an electromagnetic ramp magnetically coupled to the electromagnetic boom, wherein the electromagnetic ramp includes a central body having a proximal end portion generally disposed at the water and extending at an upwardly inclined angle away from the water to a distal end portion, wherein the plurality of electrically coupled solenoids comprises:
- a pair of first phase solenoids which generates a first electromagnetic pulse;
- a pair of second phase solenoids exclusive from the pair of first phase solenoids and which generates a second electromagnetic pulse at a time offset from the first electromagnetic pulse; and
- a pair of third phase solenoids exclusive from the pair of first phase solenoids and the pair of second phase solenoids, and which generates a third electromagnetic pulse at a time offset from the first electromagnetic pulse and the second electromagnetic pulse.

8. The electromagnetic pulsed-wave system of claim 7 wherein at least one of the plurality of electrically coupled solenoids includes a solenoid that is separated from another adjacent solenoid of the plurality of electrically coupled solenoids by approximately 0.79 times the radius of the solenoid coils.

9. The electromagnetic pulsed-wave system of claim 7 wherein a 4-phase sequence is used to generate the electromagnetic pulsed-wave for controlling the colloidal mixture.

10. The electromagnetic pulsed-wave system of claim 7 wherein the electromagnetic pulsed-wave is a time-varying wave formed from a plurality of electromagnetic pulses emanating from the plurality of electrically coupled solenoids.

11. The electromagnetic pulsed-wave system of claim 7 wherein the plurality of electrically coupled solenoids further comprises a pair of fourth phase solenoids paired to generate a fourth electromagnetic pulse at a time offset form the third electromagnetic pulse.

* * * * *